(12) United States Patent
Mastin

(10) Patent No.: US 7,524,075 B2
(45) Date of Patent: Apr. 28, 2009

(54) ROTATOR SHOCK AND VIBRATION ABSORBING MOUNTING SYSTEM

(75) Inventor: Michael F. Mastin, Livonia, NY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 0 days.

(21) Appl. No.: 11/540,464

(22) Filed: Sep. 29, 2006

(65) Prior Publication Data
US 2008/0080164 A1 Apr. 3, 2008

(51) Int. Cl.
F21V 21/30 (2006.01)

(52) U.S. Cl. .................. 362/35; 362/524; 362/526; 362/390; 362/369; 362/513; 362/514

(58) Field of Classification Search .................. 362/35, 362/390, 322, 542, 544, 524, 526, 369
See application file for complete search history.

(56) References Cited

U.S. PATENT DOCUMENTS

| 3,117,302 | A | | 1/1964 | Cardarelli | |
|---|---|---|---|---|---|
| 4,229,781 | A | | 10/1980 | Hitora | |
| 4,295,691 | A | * | 10/1981 | Rubenthaler | ................ 384/297 |
| 4,298,911 | A | | 11/1981 | Headrick | |
| 4,701,743 | A | | 10/1987 | Pearlman et al. | |
| 4,970,627 | A | | 11/1990 | Beaumont et al. | |
| 5,091,828 | A | * | 2/1992 | Jincks et al. | ................ 362/542 |
| 5,160,874 | A | * | 11/1992 | Lyons et al. | ................ 318/268 |
| 5,339,224 | A | | 8/1994 | Woehler | |
| 5,860,726 | A | | 1/1999 | Richardson | |
| 5,946,122 | A | | 8/1999 | Itoh et al. | |
| 6,461,009 | B2 | | 10/2002 | Smith | |
| 6,789,912 | B2 | | 9/2004 | Smith | |
| 6,863,424 | B2 | * | 3/2005 | Smith | .......................... 362/455 |
| 6,966,682 | B2 | * | 11/2005 | Frank et al. | ................. 362/544 |

* cited by examiner

Primary Examiner—Stephen F Husar
Assistant Examiner—Jessica L McMillan
(74) Attorney, Agent, or Firm—Kenneth J. Lukacher; Martin Lukacher

(57) ABSTRACT

A shock absorbing mounting for a rotating warning light for a light bar is provided by the assembly of the rotator with a base member useful for mounting one or more rotators and other light producing array units. The light bar base member has longitudinal grooves and the mounting enables the rotator to be attached wherever desired along the grooves. The grooves are blind grooves. The rotator has its own base with a plurality of holes in which are provided resilient shock absorbing grommets with holes therethrough. The assembly of the rotator to the light bar base member is via self-threading screws which have heads, parts of which may be washers, which enlarge the diameter of the heads. The screws are of such length that when they engage and are stopped by the bottom of the grooves, the head compresses the grommet sufficiently to provide a resilient shock absorbing connection. The height of the grommet and the depth of the grooves to the bottom are slightly longer than the length of the screw up to the head thereof, such that when the screw is bottomed in the groove the grommet is compressed to a desired extent which provides a connection while retaining the shock-absorbing characteristics of the grommet and without the need for additional elements to set the amount of compression of the grommet.

9 Claims, 6 Drawing Sheets

ROTATOR SHOCK AND VIBRATION ABSORBING MOUNTING SYSTEM

The present invention relates to warning light systems, such as light bars, and more particularly, to a shock mounting system for mounting a rotator which provides a rotating light beam in a light bar in a manner to provide vibration and shock absorption and isolation of the rotator.

The present invention provides a rotator mounting system which assembles a rotator with a light bar base in shock mounted relationship with fasteners that connect the rotator via the shock mounts to a light bar base member without over compressing the shock mount, where over compression can reduce the shock and absorbing capability of the mounting system. U.S. Pat. No. 5,860,726, issued Jan. 19, 1999 to Richardson, describes a resilient shock mount for a rotating warning light or rotator where a spacer is used to limit the compression of the shock mount against a base member to which the rotator is connected via the shock mount. Shock mounts as described in the Richardson patent, and as are used in a rotator mounting system provided by this invention, are shock absorbing grommets of soft, flexible material (elestromeric material such as rubber). These grommets enable vibration and shocks to be damped and minimize the transference of noise between the rotator and the vehicle on which a light bar containing the rotator is mounted, usually on the roof of the vehicle. Such shock absorbing grommets can be easily crushed and deformed (over compressed) so that they become either ineffective or cause the rotators to be mounted other than horizontally. If the rotators are not mounted horizontally, the rotating beams can be projected other than horizontally and reduce the warning effectiveness of the rotator. Spacers are provided in the mounting system of Richardson patent to control the amount of compression of the grommets and maintains the horizontal relationship of the light beams as desired, such spacers add to the cost of the rotator.

It is a feature of the invention to avoid the need for such spacers and yet provide an assembly utilizing shock-absorbing grommets which maintain their absorbing characteristics. Three spacers are used in each rotator mounting system of the Richardson patent. Therefore elimination of the need for spacers, while retaining the soft flexible, preferably molded, shock absorbing grommets, provides a cost advantage without degradation of the shock absorbing properties of the grommet in the rotator mounting system.

Briefly described, the shock mounting system for a rotator in a light bar in accordance with the invention includes the assembly of the rotator and a light bar base member having blind, longitudinal grooves running lengthwise thereof. The grooves enable the assembly of a rotator or rotators anywhere along the length of the light bar member. The assembly fasteners, such as self-threading screws, extend through the holes into the blind grooves having depths, such that the height of the shock absorbing grommets and the hole through which the screws extend, is slightly less than the length of the screws. The depth of the blind grooves is less than the length of the screw when the screws bottom in the blind grooves. Accordingly the mounting screws, one of which is provided for each of the grommets in the base of the rotator, will bottom out in the grooves when the head of the screw is at the requisite "crush" or "compression" height for the grommet to provide an effective shock absorbing connection between the base of the rotator and the light bar base member. The grooves may be in aluminum extrusions and the blind grooves have depth to the bottom thereof, such that the base of the rotator is assembled by the screws in compressing relationship with the grommet, but do not over compress or distort the grommet. Over compression and distortion is avoided without the need for tubular spacers as used in the Richardson patent.

The foregoing and other features and advantages of the invention will become more apparent from a reading of the following description in connection with the accompanying drawings in which:

FIG. 4A showing one of the screws in the blind groove in the light bar base member and another screw in the process of being inserted through the grommet into the blind groove in the light bar base member.

The term "extrusion" is used to describe an aluminum extrusion 5 which provides the light bar base member. The term "head" is used to designate the head of one of screws 6a, b, and c as including their respective washer 8a, b and c. The washers should be deemed parts of the screw heads, even though they may be separate washers which are assembled with the screws.

Figure 1:
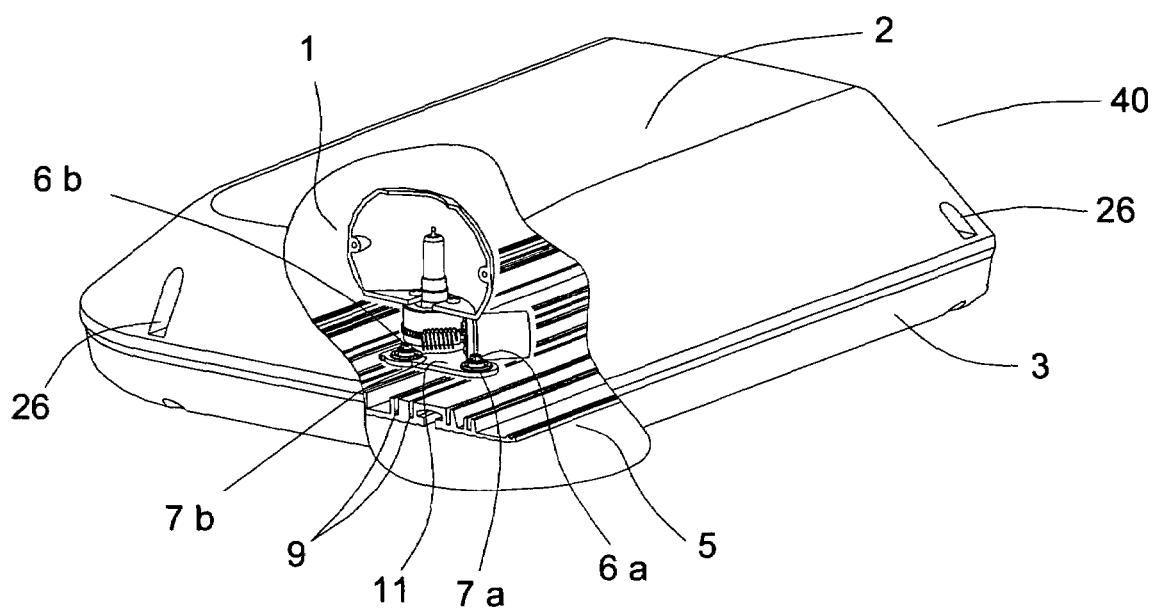
FIG. 1 is a cutaway, perspective view of one end of a light bar exposing the interior in which a rotator is assembled to a light bar base member.
Figure 2:
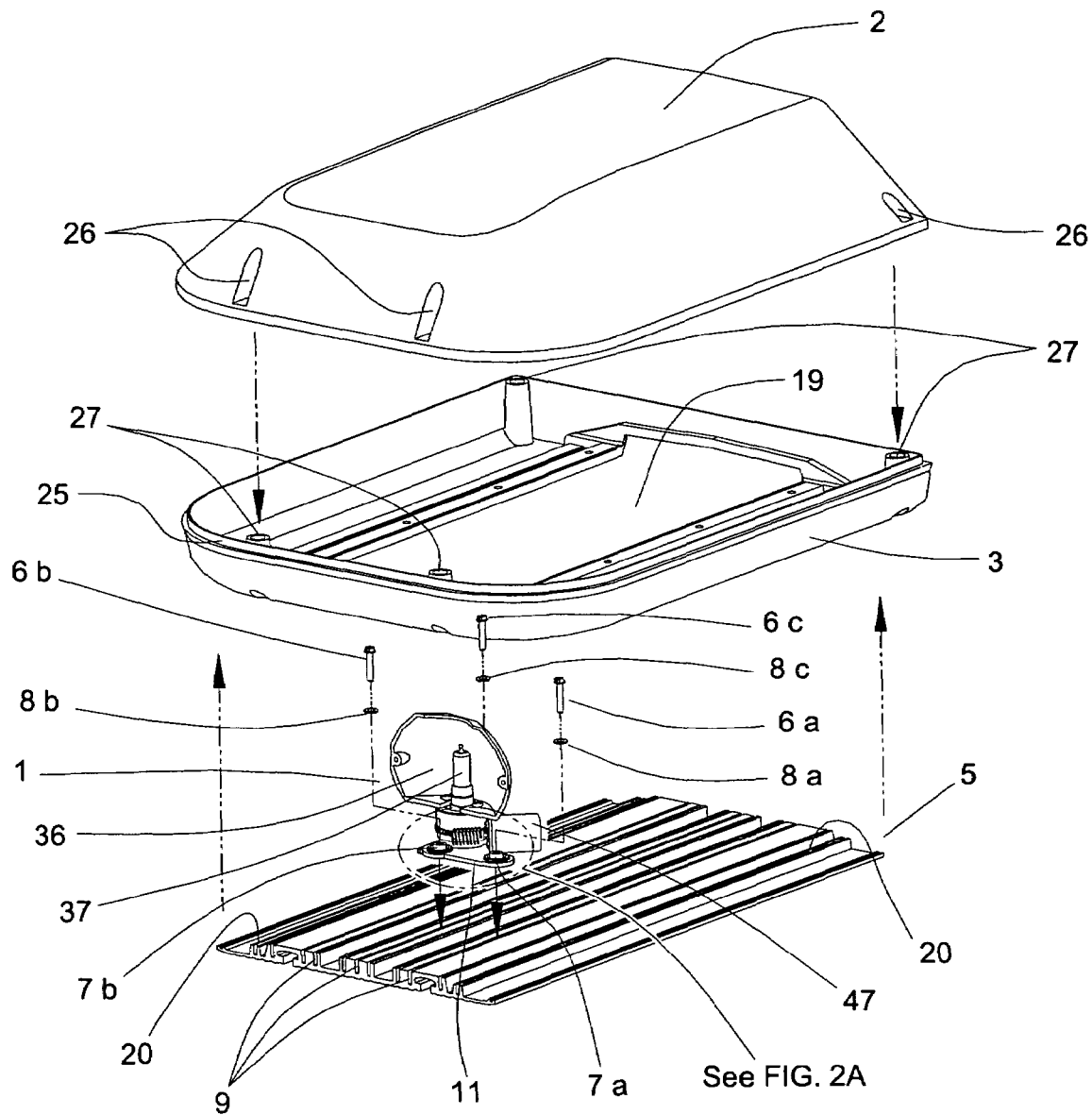
FIG. 2 is an exploded view of the light bar and rotator mounting system which is shown in FIG. 1.
Figure 2A:
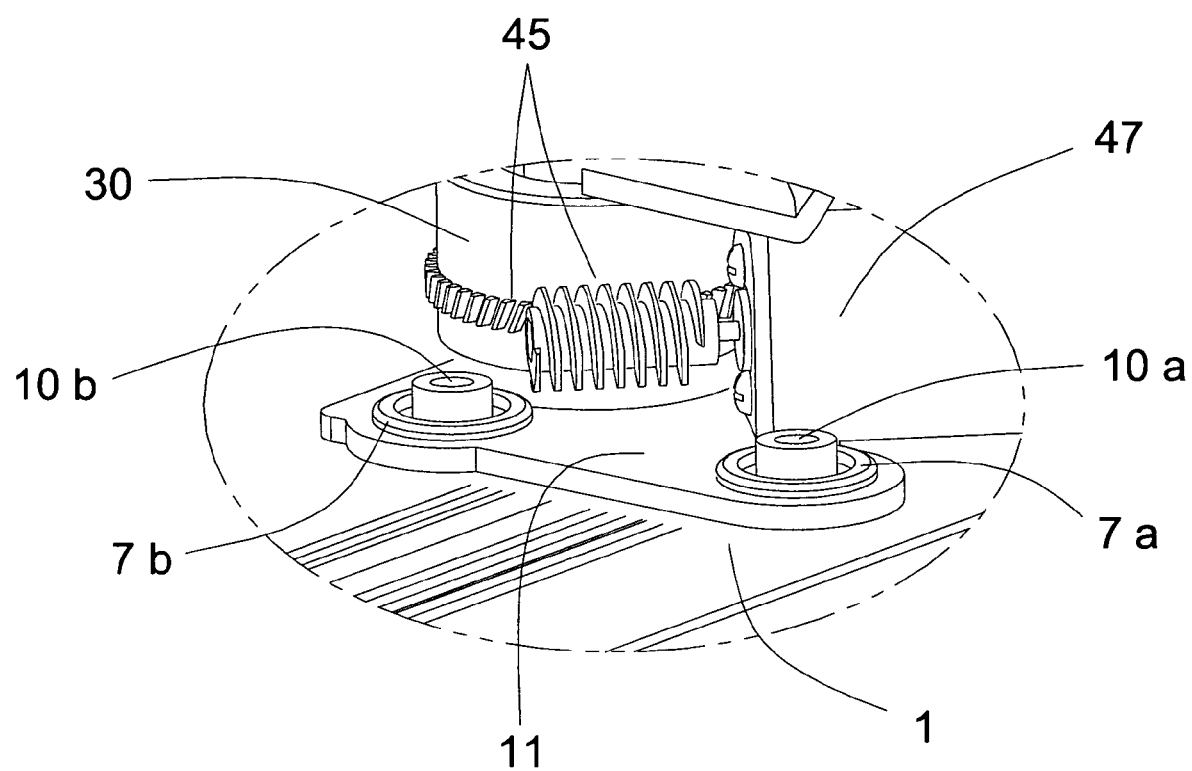
FIG. 2A is an enlarged view of the exploded view of FIG. 2 shown within the area depicted by the dot-dash line marked "See FIG. 2A"

Referring to the drawings, FIGS. 1 and 2, show a light bar 40 in which one rotator 1 is assembled with an extrusion 5 having grooves extending lengthwise thereof and enabling the rotator to be located anywhere in the light bar, alone or together with other rotators or light producing arrays (not shown to simplify the illustration). The light bar 40 has a top transparent or translucent dome 2 and a bottom dome 3 which are assembled together in clamshell fashion. The bottom dome 3 has an opening 19 over which the extrusion 5 is disposed with the extrusion closing the opening. The extrusion 5 may have shelves 20 along opposite edges of the extrusion which are attached to lips 22 defining the sides edges of the opening 19 in the bottom light dome 3 (see also FIG. 4). The shelves 20 and lips 22 may be attached by screws 23 and 24 (see FIG. 3). The top dome 2 is attached, with the edge thereof overlapping a rim 25 of the bottom dome, by means of screws (not shown) which extend through notches 26 in the top dome 2 into posts 27 in the bottom dome.

The light bar extrusion 5 has laterally spaced blind grooves 9 extending longitudinally thereof. See especially FIGS. 3, 4 and 4A. There are other bars and internal cavities in the extrusion 5 which are used to attached other light units and may be used in the attachment of the light bar to the exterior roof of a vehicle, such as an emergency police, fire or ambulance vehicle.

Figure 3:
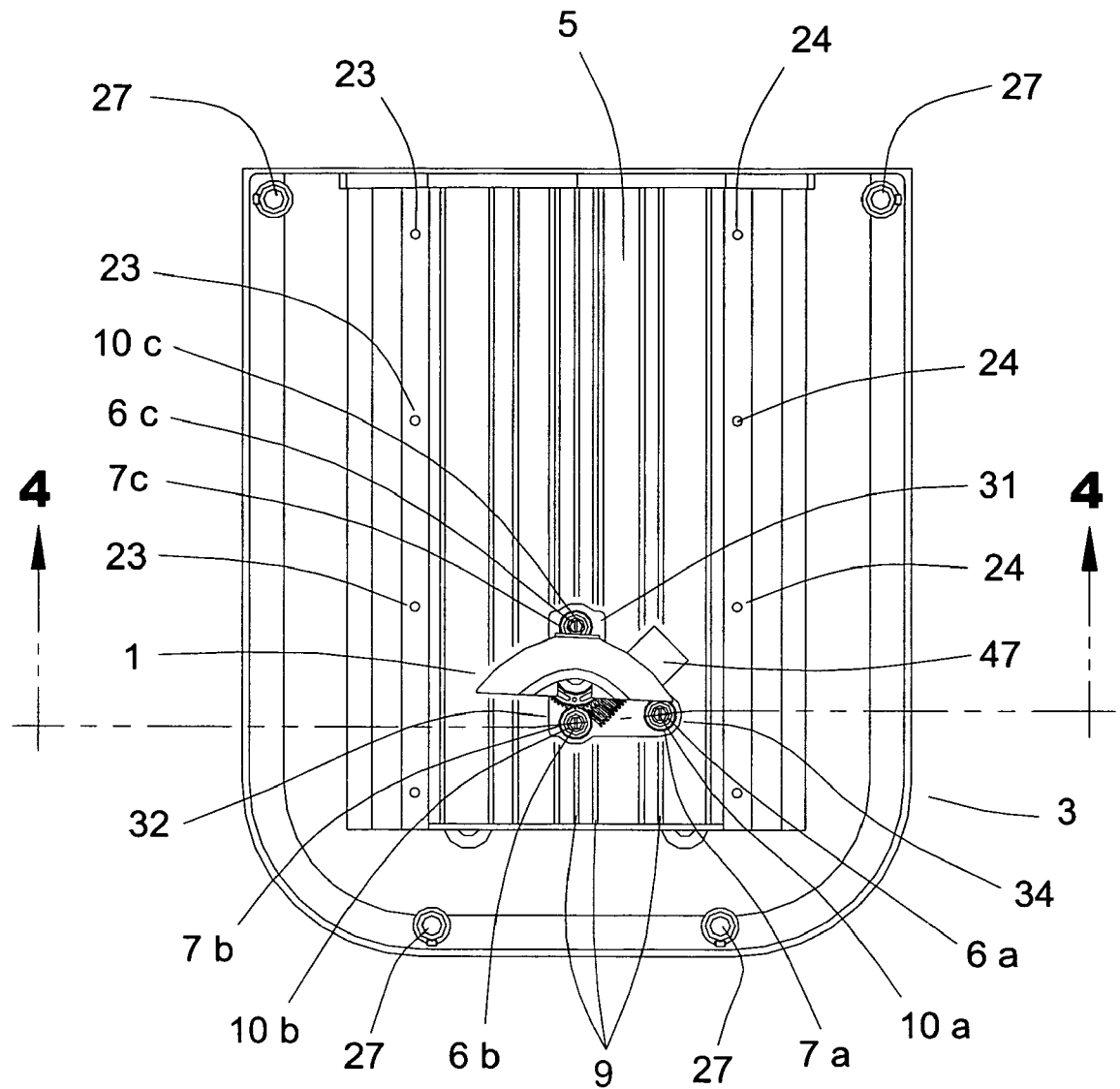
FIG. 3 is a plan view of the light bar shown in FIG. 1 with the top light bar dome removed.

The rotator 1 is similar to the rotator shown in the Richardson patent. It has a base 11 preferably made of plastic, epoxy fiberglass reinforced board material is suitable. The base is L-shaped, as shown in FIG. 3, and has two legs, one of which is perpendicular to the other. Near the ends and at the junction 32 of these legs are holes in which the shock absorbing grommets 7a, b, and c are disposed. These grommets are preferably molded into the holes in the base. For example, the base 11 may be placed in a mold and rubber or rubber epoxy elestromeric material (for example, EDPM) is molded in a shape so as to provide central cylinders having through holes 10 and grooved rings which are connected to the central cylinder by circular, disc like webs. The shape of the grommets 7a, b, and c is shown best in FIG. 4A.

One of the blind grooves 9 is aligned with the holes 10b and 10c in the grommets 7b and c near the end of one of the legs 31 (see FIG. 3) of the base 11 and at the junction 32 of the legs 31 and 34. Another of the grooves 9 is, as shown in FIG. 4A, aligned with the hole 10a in the grommet 7a. The extrusion enables mounting of rotators and light arrays of different size or with holes and grommets in different spaced relationships as illustrated herein.

Figure 4:
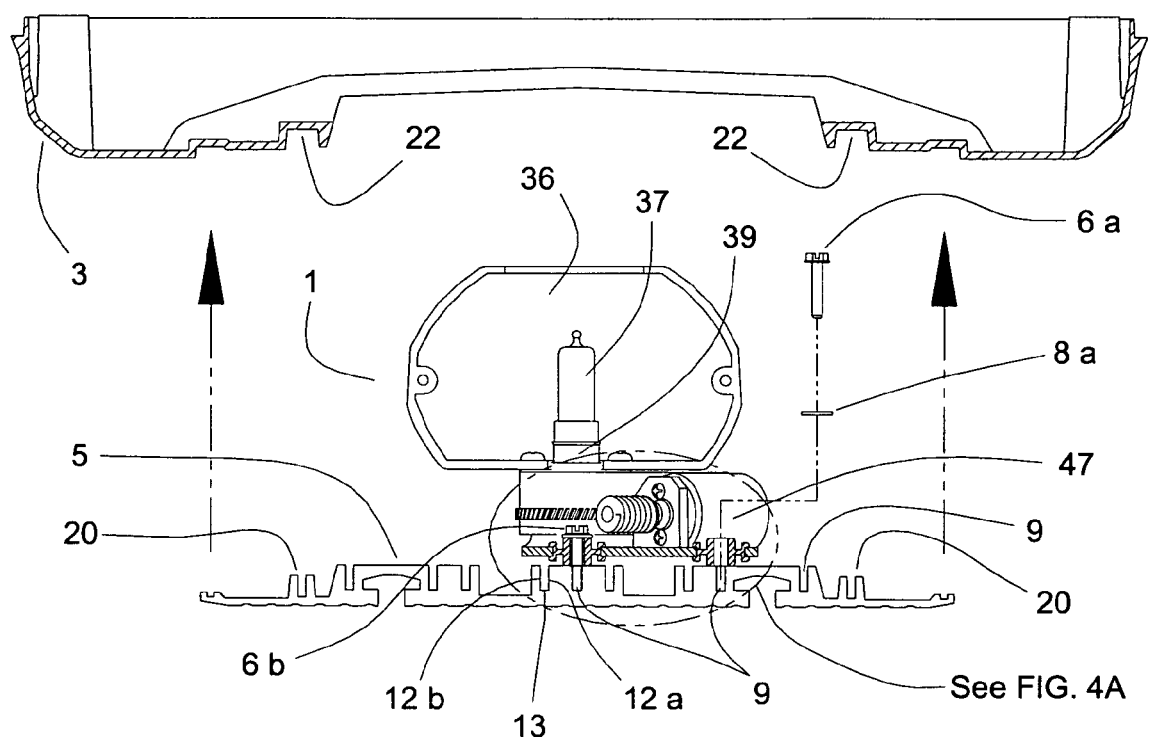
FIG. 4 is a sectional, exploded view taken along line 4-4 in FIG. 3, showing the assembly of the rotator and light bar base member and the bottom light bar dome.
Figure 4A:
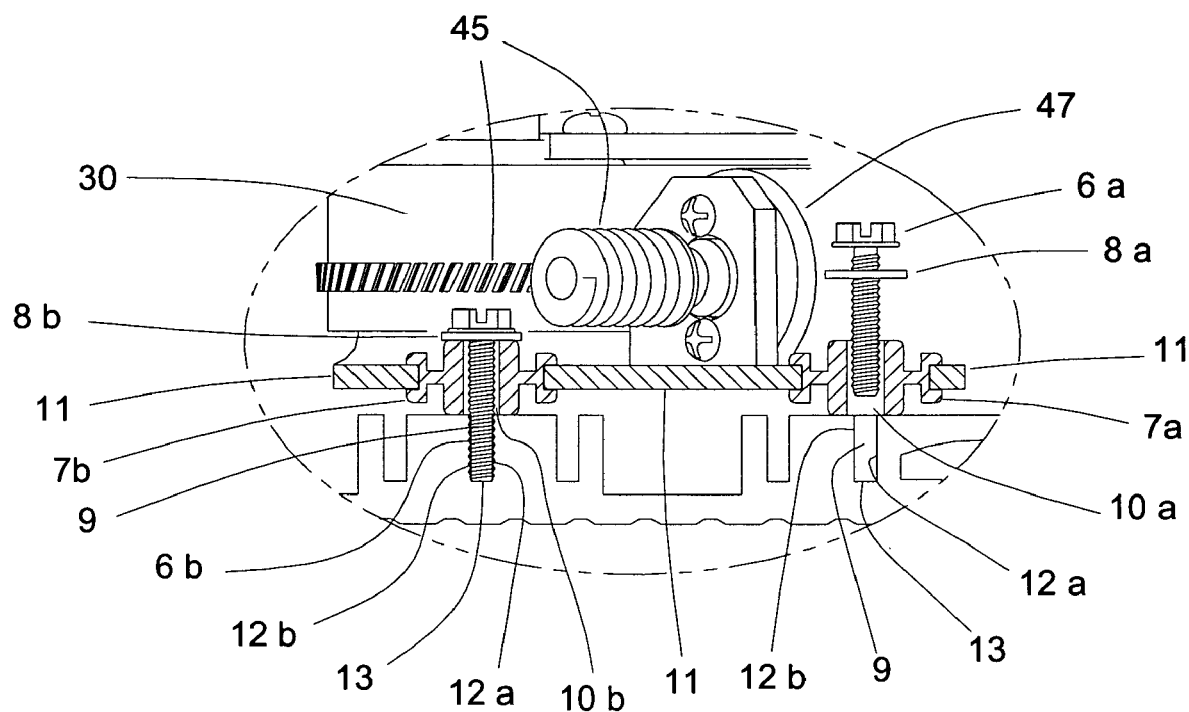
FIG. 4A is an enlarged view of the area of FIG. 4 in the area enclosed by the dot-dash line marked "See FIG. 4A".

The screws 6a, b, and c are inserted through the holes 10 in the central cylindrical of the grommets 7 as illustrated in FIGS. 4 and 4A. The screws are preferably self-threading screws which form threads in the sides 12a and b of the grooves in which the screws are inserted. The screws are of such length that when they stop at the bottom 13 of the grooves, the heads of the screws provide the desired compression of the grommets 7a, b, c in the central cylinders thereof so as to mount the base of the rotator horizontally for desired direction of the rotating beam projected from the rotator 1.

The rotator itself includes a rotatable bushing 30 which is rotated through a gear coupling 45 by a motor 47 around a socket 39 mounted on the base 11. The coupling 45 is connected to a reflector 36. A lamp 37 is disposed in the socket 39 illuminates the reflector 36 which projects the rotating beam from the rotator. Reference may be had to the Richardson patent for further details with respect to the rotator itself.

From the foregoing description it will be apparent that there has been provided an improved rotator mounting system for light bars. Variations and modifications in the herein mounting system, within the scope of the invention, will undoubtedly suggest themselves to those skilled in the art. For example, the equivalent of grooves may be provided by a series of blind holes which are spaced along lines lengthwise of the extrusion. The use of grooves is, however, preferred since they are easier to extrude and provide more flexibility in the location of the rotator and other light bar units. Accordingly the foregoing description should be taken as illustrative and not in a limiting sense.

The invention claimed is:

1. A mounting system for a rotator in a light bar which comprises a light bar base member having a plurality of blind grooves extending lengthwise of said light bar base, a rotator having a base on which a lamp is mounted around which a reflector is rotated by a motor via drive coupling between the motor and the reflector, said rotator base having a plurality of holes in which grommets of vibration and shock absorbing material are disposed, said grommets having holes therethrough, fasteners extending through said holes in said rotator base into said light bar base blind grooves and being fastened to said light bar base in said grooves, said fasteners having heads and ends, said ends engaging and being bottomed in said light bar base by said blind grooves at bottoms thereof, and said fasteners being of a length between said heads and said ends which is less than both said blind grooves and said grommets in height, such that said grommets are under compression between said fastener heads and said light bar base.

2. The system according to claim 1 wherein said fasteners are screws which are threaded into said grooves along walls thereof.

3. The system according to claim 1 wherein said heads of said fasteners include washers which bear against said grommets when said grommets are compressed against said light bar base without restriction by compression restricting spacers in said holes of said grommet.

4. The system according to claim 1 wherein said fasteners are self threading screws which are threaded into said base along walls of said grooves.

5. The system according to claim 1 wherein said light bar base is an extrusion formed with said grooves therein, the ones of said grooves into which said fasteners are threaded being spaced apart corresponding to the spacing of at least two of said holes in said grommets in said rotator base.

6. The system according to claim 5 wherein said rotator base has legs which are perpendicular to each other and define an L-shape, and said holes are substantially where said legs connect to form said L-shape and near the ends of said legs.

7. The system according to claim 1 wherein said grommets have central, cylindrical sections, and outer cylindrical rings joined by webs, said webs having peripheral grooves, said rotator base holes, along the inner peripheries, being received in said grooves in said peripheral grommet rings, said central cylinders of said grommets defining the height of said grommets which is compressed between said fastener heads and said light bar base.

8. The system according to claim 7 wherein said grommets are molded in said holes in said rotator base, the material of rotator base being selected from metal and plastic, and the material of said grommets being selected from yieldable, flexible material of plastic or rubber.

9. The system according to claim 1 wherein said light bar base is longer than said rotator base in the lengthwise direction and said rotator base is sufficiently long such that a plurality of warning light units selected from rotators and lamp arrays are attachable to said light bar base in said grooves therein and spaced lengthwise of said light bar base from each other.

* * * * *